US009722455B2

(12) United States Patent
Saari et al.

(10) Patent No.: US 9,722,455 B2
(45) Date of Patent: Aug. 1, 2017

(54) CONTROLLING AN APPLICATION PARAMETER (71) Applicant: NOKIA CORPORATION, Espoo (FI)

(72) Inventors: Jarmo Saari, Turku (FI); Timo Toivanen, Mantsala (FI)

(73) Assignee: Nokia Technologies Oy, Espoo (FI)

( * ) Notice: Subject to any disclaimer, the term of this patent is extended or adjusted under 35 U.S.C. 154(b) by 13 days.

(21) Appl. No.: 14/758,038

(22) PCT Filed: Dec. 5, 2013

(86) PCT No.: PCT/FI2013/051141
§ 371 (c)(1),
(2) Date: Jun. 26, 2015

(87) PCT Pub. No.: WO2014/102450
PCT Pub. Date: Jul. 3, 2014

(65) Prior Publication Data
US 2015/0357862 A1    Dec. 10, 2015

(30) Foreign Application Priority Data
Dec. 27, 2012  (EP) .................................... 12199409

(51) Int. Cl.
*H02J 7/02*     (2016.01)
*G06K 7/10*     (2006.01)
(Continued)

(52) U.S. Cl.
CPC .......... *H02J 7/025* (2013.01); *G06K 7/10297* (2013.01); *G08C 17/02* (2013.01); *H04L 67/125* (2013.01); *H04M 1/72527* (2013.01); *H04W 4/001* (2013.01); *H04W 4/026* (2013.01); *H04W 4/206* (2013.01); *H05B 37/0272* (2013.01); *G08C 2201/10* (2013.01);
(Continued)

(58) Field of Classification Search
CPC   H02J 7/025; H02J 50/90; H02J 7/042; G06K 7/10297; G08C 17/02; G08C 2201/10; G08C 2201/32; G08C 2201/93; H04L 67/125
See application file for complete search history.

(56) References Cited

U.S. PATENT DOCUMENTS 8,207,906 B2    6/2012   Tiscareno et al.
9,318,905 B2 *  4/2016   Tsang .................... H02J 7/0044
(Continued)

FOREIGN PATENT DOCUMENTS

CN   102217201 A      10/2011
JP   2010-206866 A    9/2010
WO   WO-2010/020895 A2  2/2010

OTHER PUBLICATIONS

Office Action for corresponding Japanese Patent Application No. 2015-550123 dated Jun. 7, 2016, with English summary, 5 pages.
(Continued)

*Primary Examiner* — Hirdepal Singh
(74) *Attorney, Agent, or Firm* — Alston & Bird LLP (57) ABSTRACT An apparatus, method, and computer program product for: receiving an indication of presence of a wireless charging field, detecting a change of orientation of a device during the presence of the wireless charging field and controlling an application parameter based on the detected change.

16 Claims, 5 Drawing Sheets (51) Int. Cl.
  *G08C 17/02*    (2006.01)
  *H04M 1/725*   (2006.01)
  *H04L 29/08*   (2006.01)
  *H04W 4/00*    (2009.01)
  *H04W 4/02*    (2009.01)
  *H04W 4/20*    (2009.01)
  *H05B 37/02*   (2006.01)

(52) U.S. Cl.
  CPC ..... *G08C 2201/32* (2013.01); *G08C 2201/93* (2013.01); *H04W 4/008* (2013.01)

(56) References Cited

U.S. PATENT DOCUMENTS

| | | | | |
|---|---|---|---|---|
| 9,590,444 | B2* | 3/2017 | Walley | H02J 7/025 |
| 2010/0039066 | A1* | 2/2010 | Yuan | H02J 7/025 |
| | | | | 320/108 |
| 2010/0081473 | A1* | 4/2010 | Chatterjee | G06F 1/1632 |
| | | | | 455/559 |
| 2012/0043932 | A1* | 2/2012 | Nakama | H02J 7/0004 |
| | | | | 320/108 |
| 2012/0214462 | A1 | 8/2012 | Chu et al. | |
| 2012/0246374 | A1* | 9/2012 | Fino | G06F 1/1632 |
| | | | | 710/303 |
| 2014/0021798 | A1* | 1/2014 | Kesler | H02J 17/00 |
| | | | | 307/104 |
| 2015/0035376 | A1* | 2/2015 | Baarman | H02J 5/005 |
| | | | | 307/104 |
| 2015/0197155 | A1* | 7/2015 | Lu | B60L 11/182 |
| | | | | 320/108 |
| 2016/0056664 | A1* | 2/2016 | Partovi | H02J 7/025 |
| | | | | 307/104 |

OTHER PUBLICATIONS

Written Opinion from corresponding International Application No. PCT/FI2013/051141, dated Feb. 6, 2014.
Extended European Search Report from corresponding European Patent Application No. 12199409.9 dated Jun. 6, 2013.
International Search Report of the International Searching Authority received in Patent Cooperation Treaty Application No. PCT/FI2013/051141, 3 pages.
Chinese Office Action for Chinese Patent Application No. 201380072512.2 dated Sep. 6, 2016, 9 pages.
Office Action for Chinese Application No. 201380072512.2 dated Apr. 20, 2017.

* cited by examiner

CONTROLLING AN APPLICATION PARAMETER

RELATED APPLICATION

This application was originally filed as Patent Cooperation Treaty Application No. PCT/FI2013/051141 filed Dec. 5, 2013, which claims priority to European Application No. 12199409.9 filed Dec. 27, 2012.

TECHNICAL FIELD

The present application relates generally to controlling an application parameter. More specifically, the present application relates to controlling an application parameter during presence of a wireless charging field.

BACKGROUND

Electronic devices typically comprise several different kinds of applications, notifications and functionalities. Often a user needs to, for example, activate or launch applications and/or control application parameters.

SUMMARY

Various aspects of examples of the invention are set out in the claims.

According to a first aspect of the present invention, there is provided a method comprising receiving an indication of presence of a wireless charging field, detecting a change of orientation of a device during the presence of the wireless charging field and controlling an application parameter based on the detected change.

According to a second aspect of the present invention, there is provided an apparatus comprising a processor, memory including computer program code, the memory and the computer program code configured to, working with the processor, cause the apparatus to perform at least the following: receive an indication of presence of a wireless charging field, detect a change of orientation of a device during the presence of the wireless charging field and control an application parameter based on the detected change.

According to a third aspect of the present invention, there is provided a computer program product comprising a computer-readable medium bearing computer program code embodied therein for use with a computer, the computer program code comprising code for receiving an indication of presence of a wireless charging field, code for detecting a change of orientation of a device during the presence of the wireless charging field and code for controlling an application parameter based on the detected change.

According to a fourth aspect of the present invention there is provided an apparatus, comprising means for receiving an indication of presence of a wireless charging field, means for detecting a change of orientation of a device during the presence of the wireless charging field and means for controlling an application parameter based on the detected change.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and its potential advantages are understood by referring to FIGS. 1 through 6 of the drawings.

Example embodiments relate to controlling an application parameter. According to an example embodiment an indication of presence of a wireless charging field is received by an apparatus. The wireless charging field may be detected, for example, by detecting a charging state of a device, detecting current or voltage induced by an electromagnetic field or by receiving a signal from a wireless charger. In an example, during the presence of the wireless charging field a change of orientation of the device is detected and an application parameter may be controlled based on the detected change. Controlling the application parameter may comprise adjusting the application parameter in dependence of the detected change.

Figure 1:
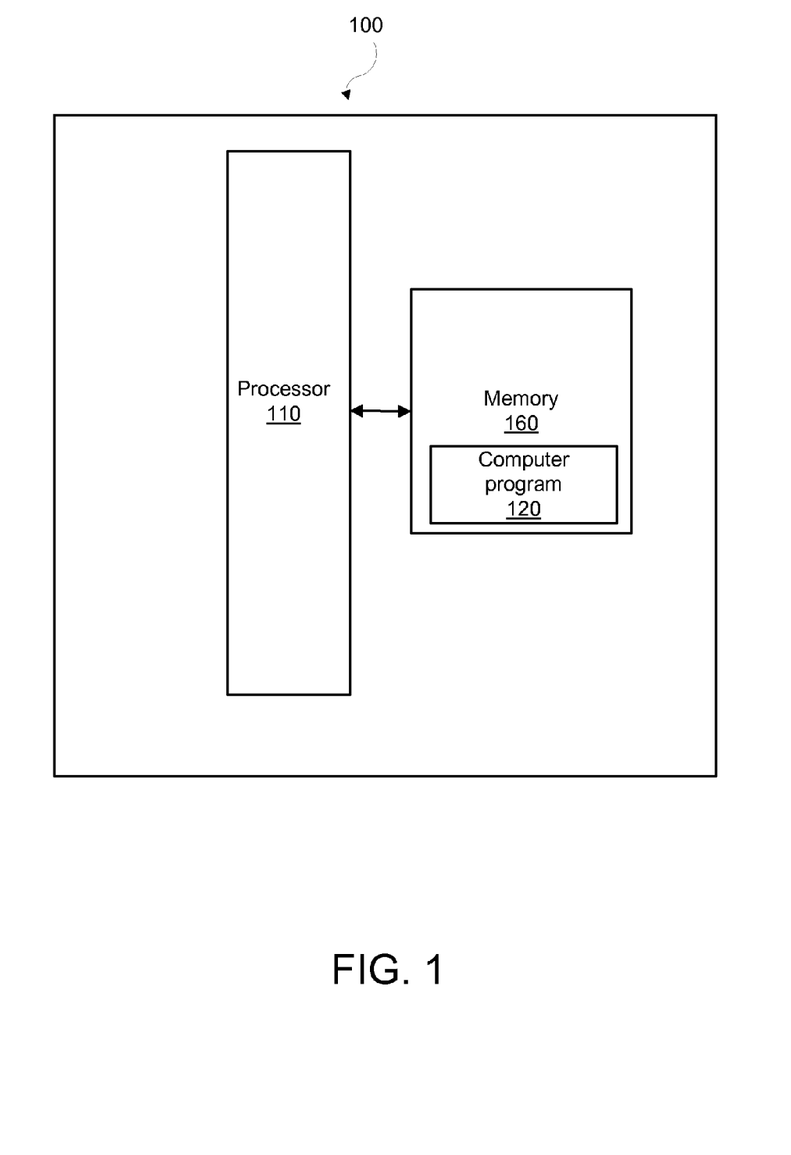
FIG. 1 shows a block diagram of an example apparatus in which examples of the disclosed embodiments may be applied.

FIG. 1 is a block diagram depicting an apparatus 100 operating in accordance with an example embodiment of the invention. The apparatus 100 may be, for example, an electronic device such as a chip or a chip-set. The apparatus 100 includes a processor 110 and a memory 160. In other examples, the apparatus 100 may comprise multiple processors.

In the example of FIG. 1, the processor 110 is a control unit operatively connected to read from and write to the memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus.

The memory 160 stores computer program instructions 120 which when loaded into the processor 110 control the operation of the apparatus 100 as explained below. In other examples, the apparatus 100 may comprise more than one memory 160 or different kinds of storage devices.

Computer program instructions 120 for enabling implementations of example embodiments of the invention or a part of such computer program instructions may be loaded onto the apparatus 100 by the manufacturer of the apparatus 100, by a user of the apparatus 100, or by the apparatus 100 itself based on a download program, or the instructions can be pushed to the apparatus 100 by an external device. The computer program instructions may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
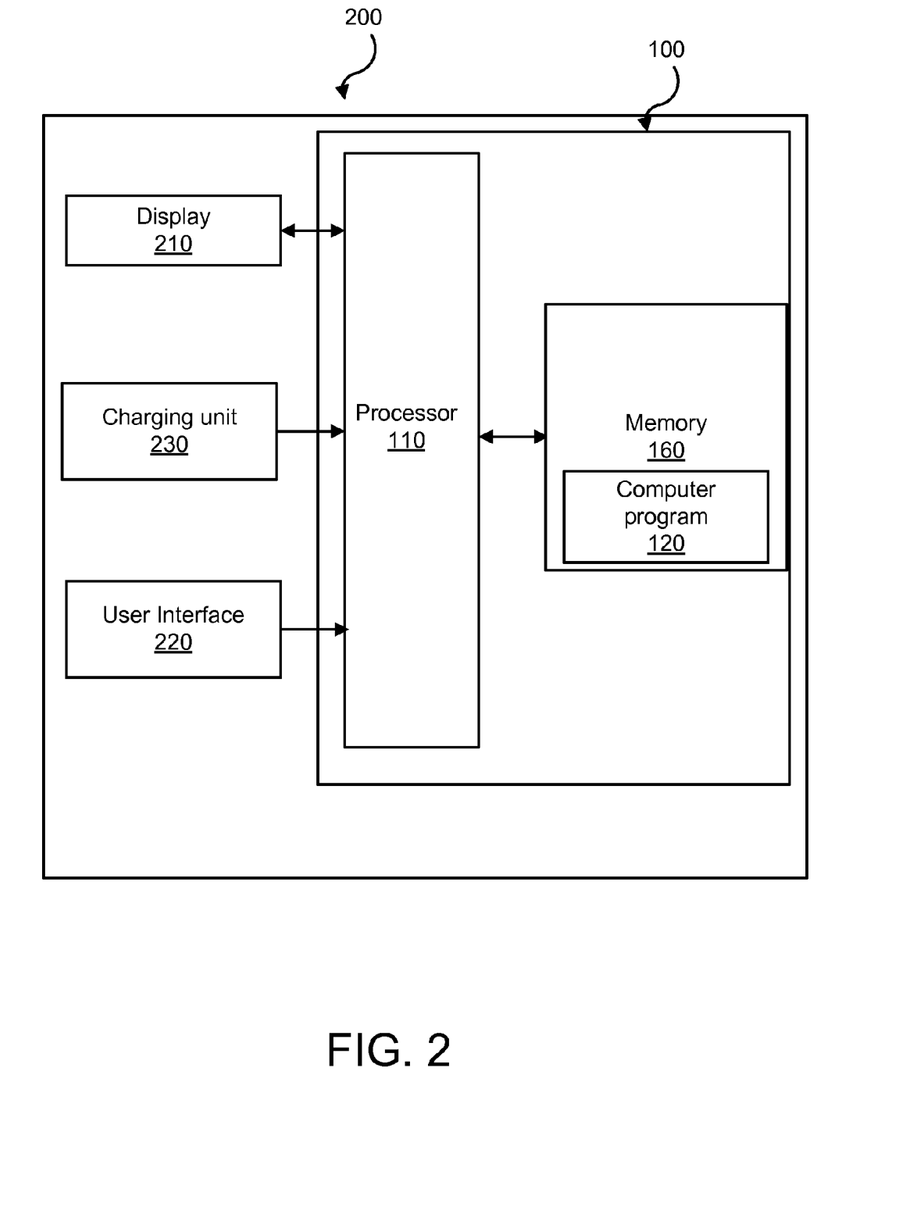
FIG. 2 shows a block diagram of another example apparatus in which examples of the disclosed embodiments may be applied.
Figure 3:
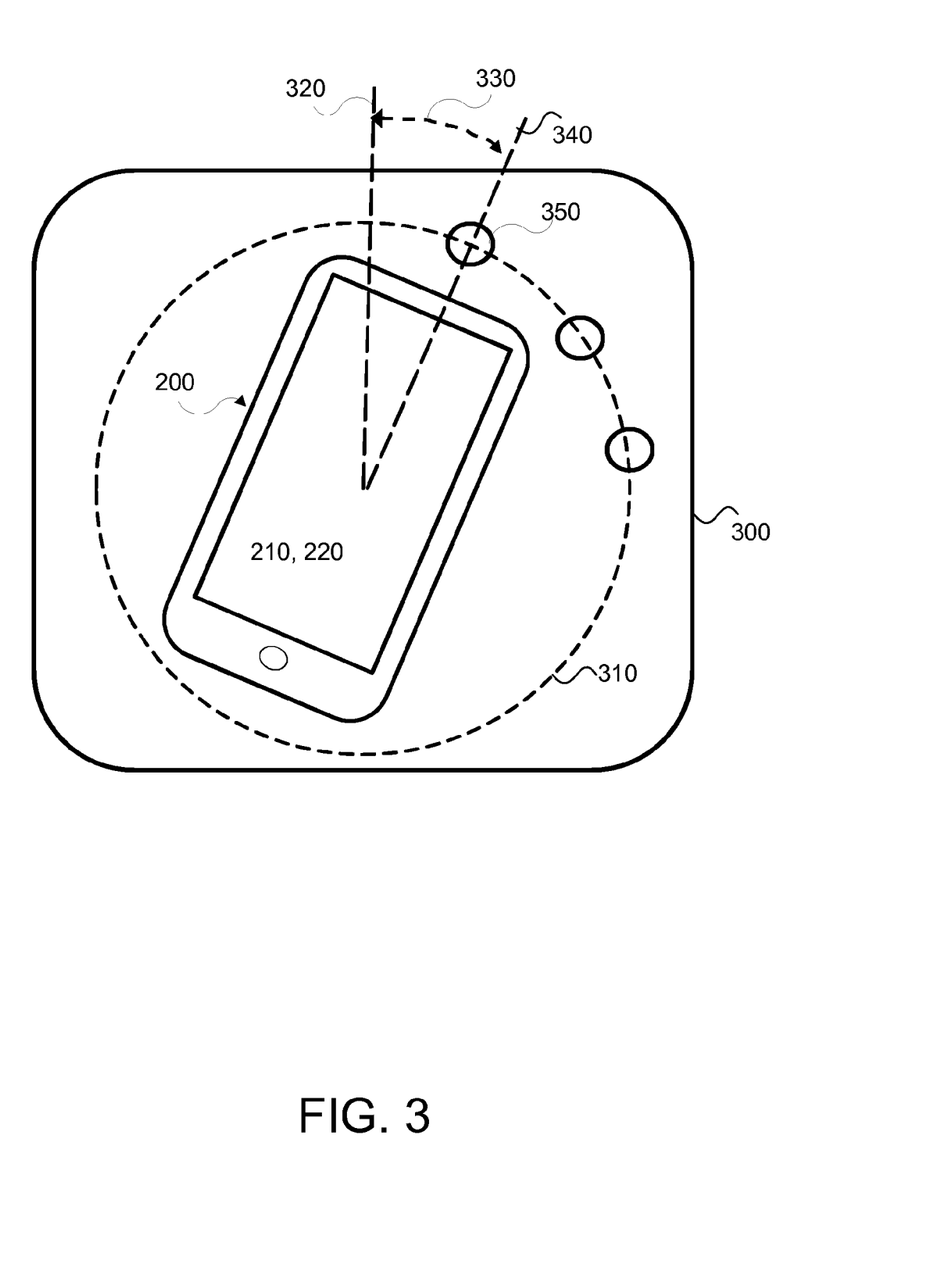
FIG. 3 illustrate an example arrangement in which examples of the disclosed embodiments may be applied.
Figure 4:
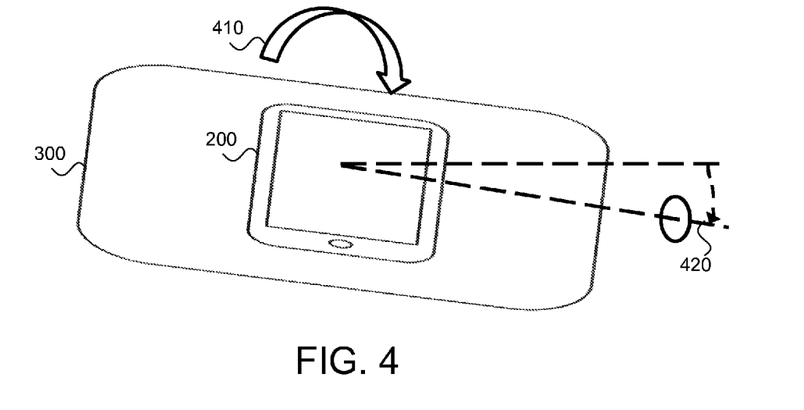
FIG. 4 illustrate another example arrangement in which examples of the disclosed embodiments may be applied.

FIG. 2 is a block diagram depicting an apparatus 200 in accordance with an example embodiment of the invention. The apparatus 200 may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a CD-, DVD or Blu-ray player, or a media player. In the examples of FIGS. 2 to 4 it is assumed that the apparatus 200 is a mobile computing device.

In the example of FIG. 2, the mobile computing device 200 is illustrated as comprising the apparatus 100, a display 210, a user interface 220 and a charging unit 230. However, the display 210 and/or user interface 220 may be external to the apparatus 200 but in communication with it. In some examples the display 210 may be incorporated into the user interface 220: for example, the user interface 220 may include a touch screen display.

Additionally or alternatively, the user interface 220 may also comprise a manually operable control such as a button, a key, a touch pad, a joystick, a stylus, a pen, a roller, a rocker, a keypad, a keyboard or any suitable input mechanism for inputting and/or accessing information. Further examples include a microphone, a speech recognition system, eye movement recognition system, acceleration-, tilt- and/or movement-based input systems. Therefore, the mobile computing device 200 may also comprise different kinds of sensors such as one or more gyro sensors, accelerometers, magnetometers, position sensors and/or tilt sensors.

The mobile computing device 200 of the example of FIG. 2 may also be configured to establish radio communication with another device using, for example, a Bluetooth, WiFi, radio frequency identification (RFID), or a near field communication (NFC) connection. In the example of FIG. 2 it is assumed that the mobile computing device 200 is at least NFC enabled.

The charging unit 230 is configured to charge a battery of the mobile computing device 200 in response to an inductive coupling with a wireless charger. In this example the wireless charger embodies one or more transmitter coils configured to produce an electromagnetic field by a flowing electrical current within the one or more coils. The electromagnetic field may be a combination of an electric field and a magnetic field. In some examples the electromagnetic field may only comprise a magnetic field or the magnetic field component may be significantly stronger than the electric field component. In some examples, the electric field component may be more dominant than the magnetic field. The properties of the electromagnetic field may depend, for example, on the distance between the wireless charger and the charging unit. The electromagnetic field is passed through one or more receiver coils of the mobile computing device 200, in which a current is induced by the electromagnetic field. The induced current is then used for charging the battery of the mobile computing device 200. In some examples the mobile computing device 200 may be placed on or next to the wireless charger to initiate wireless charging.

In an example embodiment, the charging unit 230 comprises one or more receiver coils, a charging circuit operatively connected to the one or more receiver coils, and one or more operative connections to the processor 110 and/or the wireless charger.

The charging unit 230 may further be configured to communicate with the wireless charger. For example, the charging unit may be configured to transmit a signal to the wireless charger indicating, for example, the strength of the received charging field, an identifier of a receiver coil and/or charging unit, required power, and/or control data for adapting power transfer from the wireless charger.

In some example embodiments the charging unit 230 may be configured to guide a user to place the mobile computing device in an optimal position with respect to the wireless charger. An optimal position may comprise a position in which the receiver coil captures as many field lines of the electromagnetic field as possible, for example to enable charging to proceeding as rapidly as possible. For example, the charging unit 230 may comprise an additional magnet configured to provide haptic feedback (e.g. a pulling force) or the processor 110 may be configured to cause providing visual, audible or any other appropriate feedback to guide a user to place the mobile computing device 200 in an optimal position with respect to the wireless charger. However, in some example embodiments the wireless charger may comprise a moving transmitter coil or an array of transmitter coils in which case means for guiding a user may not necessarily be needed. It should be noted that wireless charging is not limited to electromagnetic induction. In some examples wireless charging may be based on, for example, magnetic resonance, electromagnetic resonance or any other suitable method that enables charging, such as a method that effectively enables current generated to receiver circuitry.

Referring back to the example of FIG. 2, in addition to a display, the mobile computing device 200 may include another kind of an output device such as a tactile feedback system for presenting tactile and/or haptic information for a user. The tactile feedback system may be configured to receive control signals provided by the processor 110. The tactile feedback system may be configured to indicate a completed operation or to indicate selecting an operation, for example. In an example embodiment a tactile feedback system may cause the mobile computing device 200 to vibrate in a certain way to inform a user of an activated and/or completed operation.

In the example of FIG. 2, the mobile computing device 200 is configured to receive an indication of a presence of a wireless charging field such as an electromagnetic field produced by a wireless charger. The indication of the presence of a wireless charging field is received by the apparatus 100 that may be configured to receive the indication of the presence of the wireless charging field, for example, by detecting a charging state of the mobile computing device 200 by the apparatus 100, by receiving a signal from a wireless charger, or by detecting that the mobile computing device is operatively connected to the wireless charger such as placed on the wireless charger. Detecting the charging state of the mobile computing device 200 by the apparatus 100 may comprise detecting current induced by an electromagnetic field in one or more receiver coils of the mobile computing device 200 or voltage induced across the one or more coils.

The mobile computing device 200 of the example of FIG. 2 is further configured to detect a change of orientation of the mobile computing device 200 during the presence of the wireless charging field. The change of orientation may be detected by the apparatus 100 by detecting activity at a discrete region different from a previous discrete region relative to the wireless charger. For example, activity at a discrete region may comprise at least establishing radio communication between the mobile computing device 200 and an NFC tag integrated in the wireless charger and based on which the apparatus 100 detects a change of orientation.

As another example, the change of orientation may be detected by the apparatus 100 by detecting an absolute or a relative change of orientation of the mobile computing device 200 by one or more gyro sensors, accelerometers and/or magnetometers. The apparatus 100 may also be configured to detect a direction of the change, for example, the apparatus 100 may be configured to detect a change in clockwise or counter clockwise direction, or a change in X-, Y- and/or Z-dimension. In an example embodiment, the apparatus 100 is configured to detect a change of orientation of the wireless charger when the mobile computing device 200 is operatively connected to the wireless charger. An operative connection may comprise, for example, an indication that the mobile computing device 200 is placed on the wireless charger, being charged by the wireless charger or in communication with the wireless charger.

The mobile computing device 200 of the example of FIG. 2 is further configured to control an application parameter based on the detected change. An application parameter may be configured to affect a property of an application such as to amplify or lessen a property of the application. For example, an application parameter may be configured to amplify or lessen a property perceivable by a user. As a further example, an application parameter may be configured to affect a behavior of an application such as to change a behavior of the application or define a particular behavior of the application. As an example, the application parameter may comprise volume, rewinding or forwarding a song, jumping to a next or a previous song in a music player application, scrolling a list, controlling a pointer or a cursor, controlling light brightness at home, setting an alarm or any appropriate application parameter.

Controlling the application parameter may comprise, for example, adjusting the application parameter in dependence on the detected change of orientation by the apparatus 100 or the mobile computing device 200. Adjusting the application parameter may be in dependence on a property of the detected change. For example, the degree of adjustment of the application parameter may be proportional (e.g. directly proportional or inversely proportional) to the detected change of orientation. As another example, the degree of adjustment of the application parameter may be proportional (e.g. directly proportional or inversely proportional) to the speed of the detected change of orientation or to the degree of the detected change of orientation.

In an example, the apparatus 100 may further be configured to activate an application in response to receiving an indication of the presence of the wireless charging field or based on an NFC tag. For example, the apparatus 100 may be configured to launch or activate a music player, an alarm clock, a web browser, an application based on a pre-defined user setting or any other appropriate application. The apparatus 100 may be configured to associate a detected change of orientation with the activated application.

Without limiting the scope of the claims, an advantage of automatically activating or launching an application may be that a user does not need to separately activate or launch an application when the mobile computing device 200 is placed on the wireless charger. A further advantage may be that the launched application may be considered as a criterion for controlling an application parameter by the apparatus 100. For example, a user may place the mobile computing device 200 on a wireless charger, and a music player application is launched automatically. As a consequence, the apparatus 100 may associate any changes of rotation with controlling the music application. The user may control, for example, the volume by rotating the phone on the wireless charger. In this example, the apparatus 100 may be configured so that rotating the mobile computing device 200 clockwise increases the volume and rotating the device counter clockwise decreases the volume.

As another example, a user may wish to charge the mobile computing device 200 during night time. The apparatus 100 may be configured so that the wireless charger is considered as a clock face: first the user may place the device 200 on the wireless charger at a first location (e.g. pointing towards 12:00) and then the user may select an alarm time by rotating the mobile computing device 200 on the wireless charger. The apparatus 100 detects the change of orientation and sets the alarm accordingly. For example, rotating the mobile computing device 200 from the first location to a second location may correspond directly to a clock face: rotating the device from pointing towards 12 o'clock to pointing towards 6 o'clock may set the alarm to 6 o'clock. Alternatively, it may be determined that the alarm is to be set to 6 hours from the current time. For example, assuming it is 1 o'clock when the mobile computing device 200 is placed at the first location and rotated towards 6 o'clock, the alarm may be set to 7 o'clock. The same principle may be used for snoozing the alarm: for example, rotating the mobile computing device 200 from a first location may cause snoozing the alarm until the time corresponding the second location or by the number of minutes corresponding to the change or orientation. In some examples, multiple rotations may be used to achieve a desired input. For example, in terms of setting an alarm, a first rotation may be used for setting hours and a second rotation may be used for setting minutes. Therefore, the apparatus 100 may be configured to control application parameters in dependence on the number of rotations. For example, the apparatus 100 may be configured to control an application parameter with a first rotation and refine the control of the application parameter with a second rotation.

According to an example embodiment, the apparatus 100 is configured to ignore a change of orientation of the mobile computing device 200 in the absence of a wireless charging field. In another example embodiment, the apparatus 100 is configured to ignore a change of orientation based on a criterion. For example, the apparatus 100 may be configured to ignore a change of orientation when a wireless charging field is present, but the apparatus 100 fails to detect a charging state.

Without limiting the scope of the claims, an advantage of controlling an application parameter during presence of a wireless charging field based on the detected change may be that a user may intuitively control an application parameter without removing the mobile computing device 200 from the wireless charging field. Another advantage may be that controlling an application based on the detected change may be limited to situations when presence of a wireless charging field is detected. In this way, a bad user experience may be avoided when the mobile computing device is in a user's pocket, for example.

FIG. 3 illustrates an example arrangement incorporating aspects of the disclosed embodiments. In this example, the mobile computing device 200 of the example of FIG. 2 comprising a touch screen display 210 incorporated into the user interface 220 is placed on a wireless charger 300. The wireless charger 300 comprises a transmitter coil for producing an electromagnetic field and NFC tags 350 incorporated in the wireless charger 300. The mobile computing device 200 is an NFC enabled device comprising a receiver coil for receiving induced current produced by the electromagnetic field. In this example, changing the orientation of the mobile computing device 200 to a particular direction by a particular distance or a particular angle, causes the device 200 to react in a defined way in dependence on the particular direction and the particular distance/angle when presence of a wireless charging field is detected.

In the example of FIG. 3, the NFC tags are evenly distributed along a circle 310 illustrated by a dashed line. It should be noted that the dashed line is for illustrative purposes only and may not be visible to the user. Further, in some embodiments the NFC tags may not be evenly distributed and/or along a circle. It should also be noted that even though FIG. 3 only illustrates three NFC tags, a different number of NFC tags may be incorporated into the wireless charger 300. For example, the wireless charger may comprise 1 to 20 NFC tags, more than 20 NFC tags, 4, 8, 12, 16 or any appropriate number of NFC tags.

The NFC tags 350 in the example of FIG. 3 represent discrete regions that can be used for detecting a change of orientation of the mobile computing device 200. The NFC tags 350 may be, for example, stickers that comprise microchips with aerials configured to store a limited amount of information. The NFC tags 350 in the example of FIG. 3 may contain information on the absolute angle 330 from a reference position 320 to a current position 340. For example, an NFC tag 350 may be configured to indicate to the mobile computing device 200 that the current position of the device is any angle between 0 (the reference position) and 360 degrees such as 30, 90, 135 or −20, −80 or −140 degrees. In this example the '+' and '−' sign may indicate the direction of orientation. For example, the '+' sign may indicate a change of orientation clockwise and the '−' sign may indicate a change of orientation counter clockwise, or vice versa. Alternatively, an NFC tag may be configured to indicate a relative change of orientation such as +/−5, 10, 15 etc. degrees from a previous orientation.

In the example of FIG. 3, the NFC tags 350 are configured to cause adjusting an application parameter in response to detecting movement of the mobile communication device 200 on the wireless charger. In other examples, the NFC tags may be configured to cause adjusting an application parameter in response to establishing a radio connection with the mobile computing device 200, or in response to both detecting movement and establishing a radio communication with the mobile computing device 200. The NFC tags may be configured to cause adjusting an application parameter based on a criterion. The criterion may comprise, for example, cause adjusting an application parameter until a predefine level and/or status is reached, by a pre-defined step, repeatedly for a pre-defined number of times, adjusting an application parameter once in response to establishing a radio connection with the mobile computing device 200, or in dependence on a charging state of the mobile computing device 200. For example, an NFC tag may be configured to cause increasing the volume by 5% in a music player application or setting an alarm to 7 am in an alarm clock application. Causing an application parameter to be adjusted may comprise indicating a change of orientation of the mobile computing device 200 to the apparatus 100, which then controls the application accordingly. As another example, an NFC tag may be encoded to directly control an application parameter by instructing the apparatus 100 to perform the controlling.

In the example of FIG. 3 the change of orientation of the mobile computing device 200 is detected based on detecting activity at discrete regions on the wireless charger. In some examples the change of orientation of the mobile computing device 200 may be based on a continuous detecting by a sensor. For example, the mobile computing device 200 may comprise one or more gyro sensors, accelerometers and/or magnetometers that may be used alone or in combination for detecting a change of orientation.

FIGS. 4 and 5 illustrate another example arrangement incorporating aspects of the disclosed embodiments. In these examples the wireless charger 300 is configured to be rotated (illustrated by the arrow 410 and the angle 420) such that the relative position of the mobile computing device 200 remains the same with respect to the wireless charger 300. In other words, when the orientation of the wireless charger 300 changes, the orientation of the mobile computing device 200 also changes, and the application parameter may be controlled accordingly. A change of orientation of the wireless charger 300 may be detected by the apparatus 100 or the apparatus 100 may be informed of the change by the wireless charger 300.

Figure 5A:
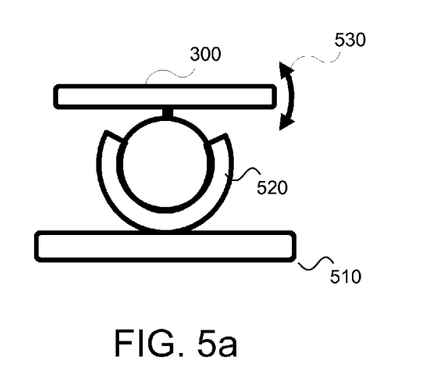
FIG. 5 illustrate a further example arrangement in which examples of the disclosed embodiments may be applied.
Figure 5B:
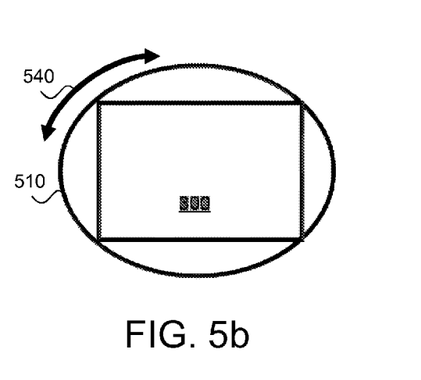

FIG. 5a illustrates a side view and FIG. 5b illustrates a top view of an example implementation of a rotatable wireless charger 300. The wireless charger 300 may be mounted with a rotatable joint element 520 to a stand 510. As illustrated by reference numbers 530 and 540, the arrangement of FIGS. 5a and 5b enable changing the orientation of the wireless charger 300 both vertically and horizontally. It should be noted that a rotatable wireless charger may be implemented in several different ways and the example of FIGS. 5a and 5b is just one example.

Figure 6:
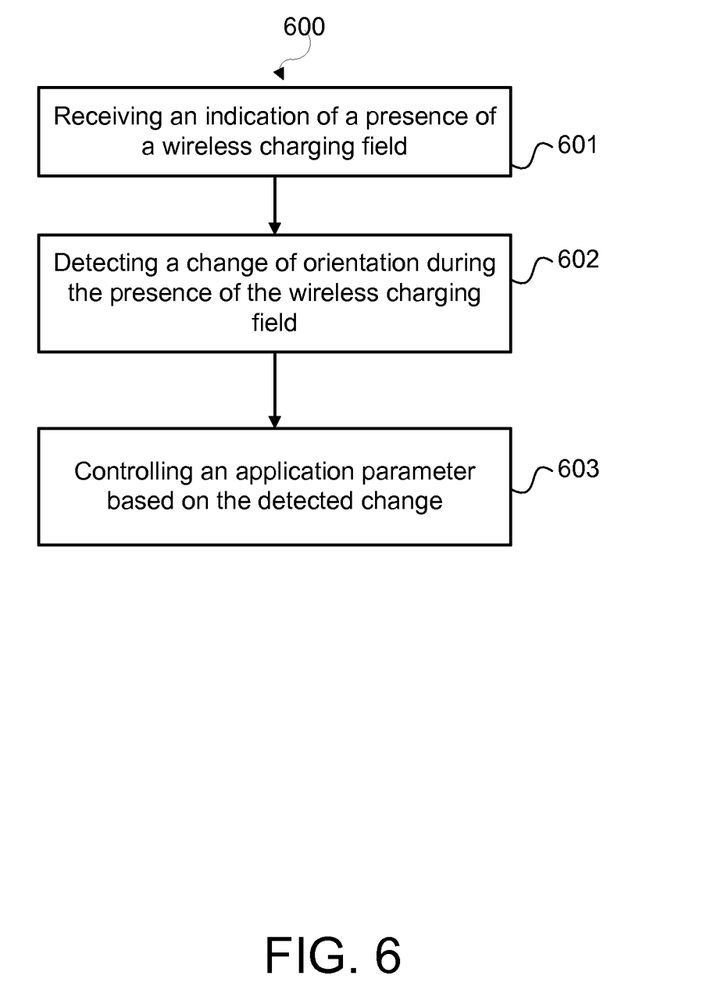
FIG. 6 illustrate an example method incorporating aspects of examples of the invention.

FIG. 6 illustrates an example method 600 incorporating aspects of the previously disclosed embodiments. More specifically the example method 600 illustrates controlling an application parameter.

The method starts with receiving 601 an indication of a presence of a wireless charging field. Receiving the indication of a presence of a wireless charging field may be based on any suitable method discussed earlier such as detecting a charging state of the mobile computing device 200 by the apparatus 100 (e.g. by detecting current induced by an electromagnetic field in a receiver coil or detecting voltage induced across a receiver coil), receiving a signal from a wireless charger or detecting an operative connection with the wireless charger (e.g. detecting that the mobile computing device 200 is placed on a wireless charger.

The method 600 continues with detecting 602 a change of orientation during the presence of the wireless charging field. As discussed earlier, detecting a change of orientation may comprise detecting activity at a discrete region different from a previous discrete region (e.g. an NFC tag) relative to the wireless charger, detecting a change in a relative or an absolute position of the mobile computing device 200. Detecting a change of orientation may also comprise detecting a direction of the change and/or a change of orientation of the wireless charger.

The method then continues with controlling 603 an application parameter based on the detected change of orientation. For example, the application parameter may be controlled in dependence on the detected change such that the amount of adjusting the parameter corresponds to the amount of the detected change of orientation or is proportional to the amount of the detected change of orientation.

The method may further comprise additional operations such as activating or launching an application in response to receiving an indication of the presence of the wireless charging field or an NFC tag, or ignoring a change of orientation of the mobile computing device in the absence of a wireless charging field or based on a criterion.

Without in any way limiting the scope, interpretation, or application of the claims appearing below, a technical effect of one or more of the example embodiments disclosed herein is intuitively controlling an application parameter when a device is on a wireless charger without removing the device from the wireless charger. Another technical effect of one or more of the example embodiments disclosed herein is easier interaction with the device since the user does not need to browse through menus etc. to control an application parameter.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a processor, and memory including computer program code, the memory and the computer program code configured to, working with the processor, cause the apparatus to perform at least the following:
receive an indication of presence of a wireless charging field;
detect a direction of a change of orientation of a device during the presence of the wireless charging field; and
control an application parameter based on the detected change.

2. The apparatus according to claim 1, wherein the memory and the computer program code are configured to, working with the processor, receive the indication of the presence of the wireless charging field by detecting a charging state of the device.

3. The apparatus according to claim 2, wherein the memory and the computer program code are configured to, working with the processor, detect the charging state of the device by detecting current induced by an electromagnetic field in a receiver coil or detecting voltage induced across a receiver coil.

4. The apparatus according claim 1, wherein the memory and the computer program code are configured to, working with the processor, receive the indication of the presence of the wireless charging field by receiving a signal from a wireless charger.

5. The apparatus according to claim 1, wherein the memory and the computer program code are configured to, working with the processor, detect the change of orientation of the device by detecting activity at a discrete region different from a previous discrete region relative to a wireless charger.

6. The apparatus according to claim 5, wherein the memory and the computer program code are configured to, working with the processor, detect activity at a discrete region, wherein the activity at the discrete region comprises at least establishing a radio communication between the device and a near field communication tag integrated in the wireless charger.

7. The apparatus according to claim 1, wherein the memory and the computer program code are configured to, working with the processor, detect the change of orientation of the device by detecting a change of a relative or an absolute position of the device.

8. The apparatus according to claim 1, wherein the memory and the computer program code are configured to, working with the processor, detect the change of orientation of the device by detecting a change of orientation of the wireless charger when the device is operatively connected to a wireless charger.

9. The apparatus according to claim 1, wherein the memory and the computer program code are configured to, adjust the application parameter in dependence on the detected change of orientation of the device.

10. The apparatus according to claim 1, wherein the memory and the computer program code are configured to, activate an application in response to receiving an indication of the presence of the wireless charging field.

11. The apparatus according to claim 1, wherein the device comprises the apparatus.

12. The apparatus according to claim 1, wherein the memory and the computer program code are configured to, working with the processor, detect the change of orientation of the device based on a continuous detecting by one or more sensors.

13. The apparatus according to claim 1, wherein the memory and the computer program code are configured to, working with the processor, detect the direction of the change in a clockwise or counter clockwise direction, or in an X-, Y- and/or Z-dimension.

14. The apparatus according to claim 1, wherein the application parameter comprises: controlling volume, rewinding a song, forwarding a song, jumping to a next song, jumping to a previous song, scrolling a list, controlling a pointer, controlling light brightness at home, setting an alarm or snoozing an alarm.

15. A method comprising:
receiving an indication of presence of a wireless charging field;
detecting a direction of a change of orientation of a device during the presence of the wireless charging field; and
controlling an application parameter based on the detected change.

16. A computer program product comprising a non-transitory computer-readable medium having computer program code stored therein, the computer program code when executed by a processor causing an apparatus to perform:
  receiving an indication of presence of a wireless charging field;
  detecting a direction of a change of orientation of a device during the presence of the wireless charging field; and
  controlling an application parameter based on the detected change.

* * * * *

UNITED STATES PATENT AND TRADEMARK OFFICE
CERTIFICATE OF CORRECTION

PATENT NO. : 9,722,455 B2
APPLICATION NO. : 14/758038
DATED : August 1, 2017
INVENTOR(S) : Saari et al.

It is certified that error appears in the above-identified patent and that said Letters Patent is hereby corrected as shown below:

On the Title Page

Item (71) Applicant: "NOKIA CORPORATION" should read --NOKIA TECHNOLOGIES OY--.

In the Claims

Column 10,
Line 4, "according" should read --according to--.

Signed and Sealed this
Twenty-seventh Day of March, 2018

Andrei Iancu
*Director of the United States Patent and Trademark Office*